(12) United States Patent
Siriwardane et al.

(10) Patent No.: US 10,030,204 B1
(45) Date of Patent: Jul. 24, 2018

(54) METAL FERRITE OXYGEN CARRIERS FOR GASIFICATION OF SOLID CARBONACEOUS FUEL

(71) Applicants: Ranjani V. Siriwardane, Morgantown, WV (US); Yueying Fan, Morgantown, WV (US)

(72) Inventors: Ranjani V. Siriwardane, Morgantown, WV (US); Yueying Fan, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 428 days.

(21) Appl. No.: 14/870,051

(22) Filed: Sep. 30, 2015

Related U.S. Application Data

(63) Continuation-in-part of application No. 14/032,628, filed on Sep. 20, 2013, now Pat. No. 9,557,053.

(51) Int. Cl.
*C10J 3/46* (2006.01)

(52) U.S. Cl.
CPC .......... *C10J 3/466* (2013.01); *C10J 2300/093* (2013.01); *C10J 2300/0976* (2013.01); *C10J 2300/0983* (2013.01)

(58) Field of Classification Search
CPC ................ C10J 3/465; C10J 2300/0976; C10J 2300/0983; C10J 2300/093
See application file for complete search history.

(56) References Cited

U.S. PATENT DOCUMENTS 4,173,454 A * 11/1979 Heins ................. C10L 9/10
110/342
6,613,110 B2 * 9/2003 Sanyal .................... C10L 5/366
44/627

(Continued)

OTHER PUBLICATIONS

Jin et al., "Development of a Novel Chemical-Looping Combustion: Synthesis of a Solid Looping Material of NiO/NiAl2O4," Ind. Eng. Chem. Res. 38 (1999).

(Continued)

*Primary Examiner* — Cephia D Toomer
(74) *Attorney, Agent, or Firm* — Jacob A. Heather; Michael J. Dobbs; Brian J. Lally (57) ABSTRACT

The disclosure provides a metal ferrite oxygen carrier for the chemical looping combustion of solid carbonaceous fuels, such as coal, coke, coal and biomass char, and the like. The metal ferrite oxygen carrier comprises $MFe_xO_y$, where $MFe_xO_y$ is a chemical composition with $1.5 \leq x \leq 2.5$ and $3.5 \leq y \leq 4.5$ and M is one of Ca, Ba, and combinations thereof. For example, $MFe_xO_y$ may be one of $CaFe_2O_4$, $BaFe_2O_4$, $MgFe_2O_4$, $SrFe_2O_4$ and combinations thereof. Mixing of the metal ferrite oxygen carrier and the solid carbonaceous fuel generates a product stream comprising at least 50 vol. % CO and $H_2$. The $MFe_xO_y$ may be supported on an inert support. In an embodiment, the $MFe_xO_y$ comprises at least 30 wt. % of the metal ferrite oxygen carrier the inert support when present comprises from about 5 wt. % to about 60 wt. % of the metal ferrite oxygen carrier.

20 Claims, 8 Drawing Sheets

(56) References Cited

U.S. PATENT DOCUMENTS 7,824,655 B2  11/2010  Slager et al.
9,797,594 B1 * 10/2017  Siriwardane et al. .. F23C 13/08

OTHER PUBLICATIONS

Roux et al., "Study and Improvement of the Regeneration of Metallic Oxides Used as Oxygen Carriers for a New Combustion Process," International Journal of Chemical Reactor Engineering, vol. 4, Art. A38 (2006).
Shulman et al., "Manganese/Iron, Manganese/Nickel, and Manganese/Silicon Oxides Used in Chemical-Looping With Oxygen Uncoupling (CLOU) for Combustion of Methane," Energy Fuels 23 (2009).
Wang et al., "Investigation of Chemical Looping Combustion of Coal with CuFe2O4 Oxygen Carrier," Energy Fuels 25 (2011).
Siriwardane et al., "Evaluation of reaction mechanism of coal—metal oxide interactions in chemical-looping combustion," Combustion and Flame 157 (2010).

* cited by examiner

METAL FERRITE OXYGEN CARRIERS FOR GASIFICATION OF SOLID CARBONACEOUS FUEL

RELATION TO OTHER APPLICATIONS

This patent application is a continuation-in-part of and claims priority from nonprovisional patent application Ser. No. 14/032,628 filed Sep. 20, 2013, which is hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a metal ferrite oxygen carrier for the gasification of solid carbonaceous fuels, such as coal, coke, coal and biomass char, and the like. The metal ferrite oxygen carrier comprises $MFe_xO_y$ on an inert support, where $MFe_xO_y$ is a chemical composition, $1.5 \leq x \leq 2.5$ and $3.5 \leq y \leq 4.5$, and M is one of Ca, Ba, Mg, Sr and combinations thereof.

BACKGROUND

The gasification of coal and other carbon-based resources is a versatile conversion technology. During gasification, feedstocks are transformed into a synthesis gas (syngas) generally comprising a mixture of $H_2$, CO and $CO_2$ which may be utilized in a variety of downstream processes. For example, the syngas may be used as a fuel in integrated gasification combined cycles (IGCC), or as a feedstock for producing $H_2$ or other hydrocarbon fuels. Syngas can also be used as a feedstock for a number of chemical processes, including Fischer-Tropsch synthesis, methanation, and methanol and ammonia production. However, conventional coal gasification processes are generally capital intensive and require significant amounts of parasitic energy. Typically they involve partial coal combustion with either $O_2$ or air in concert with a catalyst to promote gasification reactions. When air is utilized, $N_2$ can enter the syngas, diluting the syngas and extraction is difficult. When $O_2$ is utilized, expensive oxygen production units tend to generate high parasitic losses. As a result, the development of alternative methods for clean coal gasification are a significant area of current interest.

Chemical-looping gasification (CLG) of coal is one alternative method. CLG utilizes oxygen carriers to transfer oxygen and react with coal, which is partially oxidized into synthetic gas consisting of CO and $H_2$. Oxygen carriers avoid direct contact with air and act as catalysts for gasification reactions. Synthesis gas produced by coal gasification with steam and oxygen carriers can be used for many important applications since the gas stream is free of $N_2$, as indicated at reaction [1].

$$\text{C+Oxygen carrier+steam} \rightarrow H_2 + CO + CO_2 (\text{No } N_2) \quad [1]$$

This $N_2$-free synthesis gas can be used to produce pure $H_2$ as shown in reaction scheme [2].

$$H_2 + CO + CO_2 \rightarrow \text{Water gas shift reaction (WGS)} \rightarrow H_2 + CO_2 \rightarrow \text{Traditional pressure swing adsorption to separate } CO_2 \rightarrow \text{Pure } H_2 \quad [2]$$

A synthesis gas stream without $N_2$ with catalysts can also be used to produce useful chemicals as shown in reaction scheme 3 and 4.

$$H_2 + CO + CO_2 \rightarrow \text{methanol} \rightarrow \text{plastics, adhesives and fuels} \quad [3]$$

$$H_2 + CO + CO_2 \rightarrow \text{fuels via Fischer-Tropsch synthesis or dimethyl ether} \quad [4]$$

However, gasification of solid fuels such as coal with oxygen carriers is a challenging process. In a fluidized-bed reactor system in which solid-solid interactions are minimal, all the reactions mainly proceed via gaseous species. For instance, steam is utilized for initial gasification of coal to produce synthesis gas, and when an oxygen carrier is present the synthesis gas is further oxidized to form $CO_2$ and $H_2O$ to complete combustion as shown in reactions [5] and [6].

$$\text{Coal+steam} \rightarrow CO + H_2 \quad [5]$$

$$CO + H_2 + \text{metal oxide} \rightarrow CO_2 + H_2O + \text{reduced metal oxide} \quad [6]$$

Therefore, when the oxygen carrier is present it is usually difficult to control the reaction at the steam gasification stage (reaction 5), preventing the combustion reaction 6.

To use oxygen carriers for direct gasification of coal, it would be useful to identify an oxide which was not reduced by reaction [6], but could still react with the solid coal, or coal volatiles. In this scenario, reaction of coal with the oxygen carrier has to occur via solid-solid reaction to form synthesis gas.

It would be advantageous to develop an oxygen carrier for gasification which reacting directly with coal to form synthesis gas which having a minimal reactivity with the synthesis gas. One of the more important criteria for CLG systems is that synthesis gas produced by the reaction with coal/oxygen carrier should not further react with the oxygen carrier, because it is necessary to avoid combustion of fuel and stop the reaction at the gasification stage.

These and other objects, aspects, and advantages of the present disclosure will become better understood with reference to the accompanying description and claims.

SUMMARY

The disclosure provides a metal ferrite oxygen carrier having improved durability and reactivity over metal oxides currently used in the chemical looping gasification of solid carbonaceous fuels, such as coal, coke, coal and biomass char, and the like. The metal ferrite oxygen carrier comprises $MFe_xO_y$ on an inert support, where $MFe_xO_y$ is a chemical composition with $1.5 \leq x \leq 2.5$ and $3.5 \leq y \leq 4.5$, and M is one of Ca, Ba, Mg, Sr and combinations thereof. For example, $MFe_xO_y$ may be one of $CaFe_2O_4$, $BaFe_2O_4$, $MgFe_2O_4$, $SrFe_2O_4$ and combinations thereof. In an embodiment, M is one of Ca, Ba, and combinations thereof.

The metal ferrite oxygen carrier may be utilized for the gasification of a solid carbonaceous fuel by delivering the metal ferrite oxygen carrier to a fuel reactor and mixing the solid carbonaceous fuel and the metal ferrite oxygen carrier at a reducing temperature, such that some portion of the metal ferrite oxygen carrier is reduced and some portion of the solid carbonaceous fuel is oxidized. Within the fuel reactor, the metal ferrite oxygen carrier interacts with the solid carbonaceous fuel and generates a reduced carrier comprising an M component and a $Fe_cO_d$ component. The M component comprises some portion of the M comprising the $MFe_xO_y$, and the $Fe_cO_d$ component comprises some portion of the Fe comprising the $MFe_xO_y$, with c>0 and d≥0. For example, the $Fe_cO_d$ component may be Fe or may be an iron oxide such as $Fe_2O_3$, among others. The reduction of the metal ferrite oxygen carrier and oxidation of the solid carbonaceous fuel at the reducing temperature generates a product stream comprising at least 50 vol. % CO and $H_2$. In an embodiment, the reducing and oxidizing temperatures are from about 700° C. to about 1100° C. In another embodiment, the metal ferrite oxygen carrier generates a product stream comprising at least 70 vol. % CO and $H_2$, and in a further embodiment, at least 80 vol. % CO and $H_2$ or at least 90 vol. % CO and $H_2$.

Embodiments of the metal ferrite oxygen carriers disclosed are further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide process for chemical looping combustion of a solid carbonaceous fuel utilizing a metal ferrite oxygen carrier which comprises $MFe_xO_y$, where $MFe_xO_y$ is a chemical composition and M is one of Ca, Ba, Mg, Sr and combinations thereof, and where 1.5≤x≤2.5 and 3.5≤y≤4.5.

The disclosure provides a metal ferrite oxygen carrier having improved durability and reactivity over metal oxides currently used in the gasification of solid carbonaceous fuels, such as coal, coke, coal and biomass char, and the like. The metal ferrite oxygen carrier comprises $MFe_xO_y$ with 1.5≤x≤2.5 and 3.5≤y≤4.5, where M is one of Ca, Ba, Mg, Sr and combinations thereof. In an embodiment, 1.8≤x≤2.2 and 3.8≤y≤4.2. In a further embodiment, M is Ca, Ba, or combinations thereof. In another embodiment, the metal ferrite oxygen carrier comprises $MFe_2O_4$. In particular embodiments, the $MFe_xO_y$ comprises at least 30 wt. % of the metal ferrite oxygen carrier. In certain embodiments, the metal ferrite oxygen carrier further comprises an inert support. The inert support material does not participate in the oxidation and reduction reactions of the $MFe_xO_y$ comprising the metal ferrite oxygen carrier. In an embodiment, the inert support comprises from about 5 wt. % to about 60 wt. % of the metal ferrite oxygen carrier and the $MFe_xO_y$ comprises at least 30 wt. % of the metal ferrite oxygen carrier. Gasification of solid carbonaceous fuel with the metal ferrite oxygen carrier generates a product stream comprising CO, $H_2$, and potentially other components such as $CO_2$, with the CO and $H_2$ comprising at least 50 vol. % of the product stream. In another embodiment, the metal ferrite oxygen carrier generates a product stream comprising at least 70 vol. % CO and $H_2$, and in a further embodiment, at least 80 vol. % CO and $H_2$ or at least 90 vol. % CO and $H_2$. As such, the metal ferrite oxygen carriers disclosed here are particularly suited for the production of syngas from the gasification of solid carbonaceous fuels, such as coal.

Figure 1:
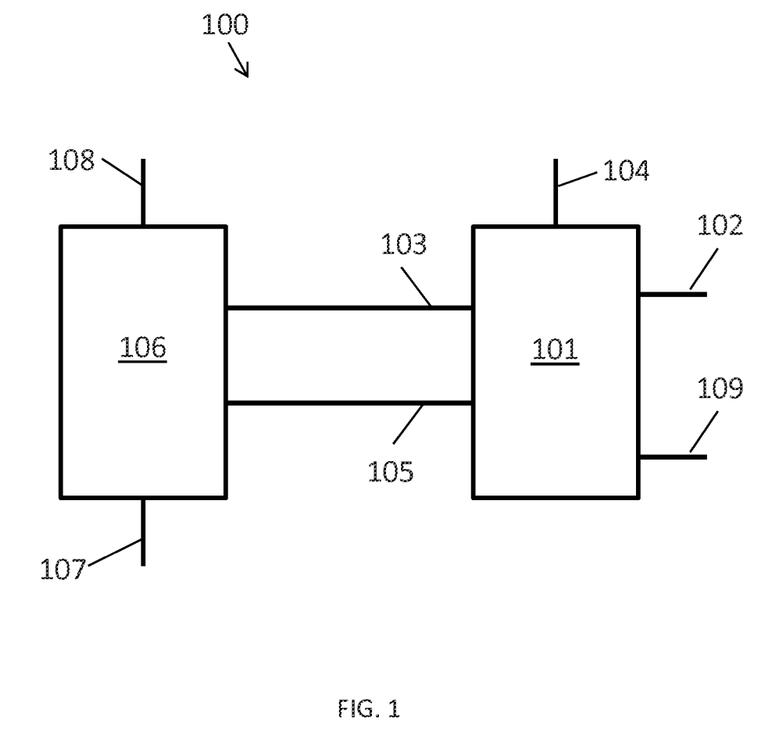
FIG. 1 illustrates a chemical looping gasification process utilizing the metal ferrite oxygen carrier.

A system within which the metal ferrite oxygen carrier disclosed here may be utilized is illustrated at FIG. 1. FIG. 1 illustrates a gasification system generally at 100 and includes fuel reactor 101. Fuel reactor 101 receives a fuel flow of solid carbonaceous fuel at 102 and the metal ferrite oxygen carrier at 103, and provides mixing among the solid carbonaceous fuel and the metal ferrite oxygen carrier. Fuel reactor 101 is at a reducing temperature sufficient to reduce at least a portion of the metal ferrite oxygen carrier. In an embodiment, the reducing temperature is from about 700° C. to about 1100° C. In certain embodiments, fuel reactor 101 may also receive a flow of gasification agent at 109, such as steam, $CO_2$, $H_2$, or any another agent intended to generate gaseous products from the solid carbonaceous fuel within fuel reactor 101.

Within fuel reactor 101, metal ferrite oxygen carrier interacts with carbon and possibly gaseous components from the solid carbonaceous fuel, and the $MFe_xO_y$ comprising the metal ferrite oxygen carrier reduces to a reduced carrier comprising one or more M components and a $Fe_cO_d$ component. The M components comprise some portion of the M comprising the $MFe_xO_y$. The $Fe_cO_d$ component comprises some portion of the Fe comprising the $MFe_xO_y$, with c>0 and d≥0. For example, the $Fe_cO_d$ component may be Fe or may be an iron oxide such as FeO, $Fe_2O_3$, and $Fe_3O_4$, among others. In an embodiment, the $Fe_cO_d$ component is $FeO_t$, where 0≤t≤1.5. For example, in an embodiment where the metal ferrite oxygen carrier is $CaFe_2O_4$ on the inert support, the $CaFe_2O_4$ interacts with carbon in fuel reactor 101 and generates a reduced carrier comprising CaO, Fe, $Fe_2O_3$, and $Ca_2Fe_2O_5$. In this embodiment, the M components CaO and $Ca_2Fe_2O_5$ generated by the reduction comprises some portion of the Ca comprising the $CaFe_2O_4$, and Fe and $Fe_2O_3$ comprise the $Fe_cO_d$ component $FeO_t$ where 0≤0≤1.5. In an embodiment, the M components comprise some portion of the M comprising the $MFe_xO_y$ and have an absence of the Fe comprising the $MFe_xO_y$, such as for example CaO. The $MFe_xO_y$ comprising the metal ferrite oxygen carrier may additionally interact with CO, $H_2$, and other gases which may be present from a gasification of the solid carbonaceous fuel.

As discussed, fuel reactor 101 is maintained at a reducing temperature and the solid carbonaceous fuel and the metal ferrite oxygen carrier mix in fuel reactor 101. The reducing temperature is sufficient to reduce some portion of the $MFe_xO_y$ oxygen carrier and oxidize some portion of the solid carbonaceous fuel, generating gaseous products with fuel reactor 101. Generally, the metal ferrite oxygen carrier and carbon comprising the solid carbonaceous fuel are brought into sufficient proximity such that the metal ferrite oxygen carrier is reduced by a solid-solid reaction with the carbon comprising the solid carbonaceous fuel. The gaseous products are withdrawn from fuel reactor 101 as a product stream at exhaust 104, and the reduced carrier may exit fuel reactor 101 at 105. At exhaust 104, at least 50 vol. % of the product stream comprises CO and $H_2$. In an embodiment, at least 70 vol. %, at least 80 vol. %, or at least 90 vol. % of the product stream comprises CO and $H_2$.

The reduced carrier exiting fuel reactor 101 at 105 may subsequently enter oxidation reactor 106. Oxidation reactor 106 further receives a flow of oxidizing gas such as air, and facilitates contact between the reduced carrier and the oxidizing gas, generating a re-oxidized carrier. The re-oxidized carrier is generated by an oxidizing reaction, where the reactants of the oxidizing reaction are a portion of the oxygen from the oxidizing gas, the M component comprising the reduced carrier, and the $Fe_cO_d$ component comprising the reduced carrier. The product of the oxidizing reaction is the re-oxidized carrier, where the re-oxidized carrier comprises $MFe_aO_b$ on the inert support. Generally, the $MFe_aO_b$ comprising the re-oxidized carrier is substantially equivalent to the $MFe_xO_y$ comprising the metal ferrite oxygen carrier. For example, when the metal ferrite oxygen carrier comprises $CaFe_2O_4$ on the inert support and the reduced carrier comprises CaO, $CaFe_2O_5$, Fe, and FeO, then the oxidation reaction generates a re-oxidized carrier comprising $CaFe_2O_4$ on the inert support. Oxidation reactor 106 is at an oxidation temperature sufficient to oxidize at least a portion of the reduced carrier. In an embodiment, the oxidizing temperature is from about 700° C. to about 1100° C.

Within this disclosure, to "reduce some portion of the metal ferrite oxygen carrier" refers to the loss of oxygen from the $MFe_xO_y$ comprising the metal ferrite oxygen carrier. For example, the reduction of a $MFe_xO_y$ composition to FeO, $Fe_2O_3$, and/or Fe and an M component, where the M component comprises some portion of the M comprising the $MFe_xO_y$, or alternatively, the reduction of a $MFe_xO_y$ composition to a $MFe_aO_b$ composition, where a/b>x/y. Additionally, to "oxidize some portion of the solid carbonaceous fuel" refers to the gain of oxygen by carbon comprising the solid carbonaceous fuel and the generation of gaseous products comprising CO. Similarly, "oxidizing" or "oxidation" as it applies to a reduced carrier comprising the M components and the $Fe_cO_d$ component means a reaction with oxygen among the M components and the $Fe_cO_d$ component, where the oxidation reaction produces the $MFe_xO_y$. A "reducing temperature" is a temperature sufficient to generate reduction and an "oxidizing temperature" is a temperature sufficient to generate oxidation under other prevailing and germane existing conditions.

Within this disclosure, "solid carbonaceous fuel" means a fuel comprising solid carbon, such as coal, coke, coal and biomass char, and the like. Under the reducing temperature of the fuel reactor and in some embodiments the influence of the gasification agent, the solid carbonaceous fuel may produce volatile gases and other compounds in the fuel reactor. In an embodiment, the solid carbonaceous fuel is at least 50 wt. % fixed carbon. In an additional embodiment, the solid carbonaceous fuel is at least 75 wt. % fixed carbon, and in a further embodiment, the solid carbonaceous fuel is at least 85 wt. % fixed carbon with a volatile matter content of less than 5 wt. %. In another embodiment where the solid carbonaceous fuel is substantially free of volatiles such as petcoke, char, and the like, the solid carbonaceous fuel is at least 90 wt. % fixed carbon. Fixed carbon and volatile matter contents may be determined by means known in the art. See e.g., ASTM Standard—Vol. 05.06 Gaseous Fuels, Coal and Coke, ASTM International (2013).

Within this disclosure, "mixing" as it pertains to a metal ferrite oxygen carrier and a solid carbonaceous fuel means bringing the metal ferrite oxygen carrier and the solid carbonaceous fuel and/or some component thereof into sufficient proximity such that the $MFe_xO_y$ comprising the metal ferrite oxygen carrier reduces to a reduced carrier comprising an M component and an $Fe_cO_d$ component at the reducing temperature within the fuel reactor. In an embodiment, mixing means bringing the metal ferrite oxygen carrier and carbon comprising the solid carbonaceous fuel into sufficient proximity such that the metal ferrite oxygen carrier is reduced by a solid-solid reaction with the carbon comprising the solid carbonaceous fuel. See e.g., Siriwardane et al., *Combustion and Flame* 157 (2010).

As stated and as is understood, the metal ferrite oxygen carrier comprising $MFe_xO_y$ may also be made up of additional components. In an embodiment, the $MFe_xO_y$ comprises at least 30 wt. % of the metal ferrite oxygen carrier. In another embodiment, the metal ferrite oxygen carrier further comprises an inert support, and the inert support comprises at least 25 wt. % of the metal ferrite oxygen carrier. In an additional embodiment, an oxygen carrier comprises a plurality of reducing components where each component in the plurality undergoes a reduction reaction in contact with the solid carbonaceous fuel, and the metal ferrite oxygen carrier comprises at least 10 wt. %, at least 25 wt. %, or at least 50 wt. % of the plurality of reducing components.

Additionally, in an embodiment, the metal ferrite oxygen carrier is a plurality of oxygen carrier pellets where each oxygen carrier pellet in the plurality comprises the $MFe_xO_y$ on the inert support. In an additional embodiment, a Sauter mean diameter of the plurality of oxygen carrier pellets is less than about 200 micron (μm), preferably less than about 100 μm. In a further embodiment, the solid carbonaceous fuel is a plurality of fuel pellets, and a Sauter mean diameter of the plurality of fuel pellets is less than about 200 micron (μm), preferably less than about 100 μm. The Sauter mean diameter may be determined by means known in the art such as sieving, microscopy, sedimentation, permeametry, laser diffraction, or other means, or as reported by a manufacturer of such as-described pellets or the operating instructions of machinery intended to produce such as-described pellets. See e.g., Martin Rhodes, *Introduction to Particle Technology* ($2^{nd}$ ed. 2008). The use of such sized pellets as described can promote solid-solid contact between the metal ferrite oxygen carrier and the solid carbonaceous fuel, enhancing the reaction mechanisms. See e.g., Fan et al., "Novel New Oxygen Carriers for Chemical Looping Combustion of Solid Fuels," Energy Fuels 28 (2014); see also Siriwardane et al., "Evaluation of reaction mechanism of coal-metal-oxide interactions in chemical looping combustion," *Combustion and Flame* 157 (2010). When a gasification agent is used for gasifying the solid fuel, the particle size of the carrier pellet may vary depending on the type of reactor bed used. In case of a fluid bed reactor, particle size may be 100-500 μm, while in moving bed applications the particle size may be 1-5 mm.

The oxidizing reaction occurring in oxidation reactor 106 is an exothermic reaction, and heat generated is carried from oxidizing reactor 106 by a gaseous flow exiting at 108. The gaseous flow exiting at 108 is comprised of the oxidizing gas less that oxygen utilized for the generation of the re-oxidized carrier, and may be sent to and utilized by a power generation cycle. For example, when the flow of oxidizing gas is air, the gaseous flow exiting at 108 is comprised of $N_2$ and possibly some remaining $O_2$, and other components. Heat from the oxidizer may also be transferred to the fuel reactor to provide heat for solid fuel gasification. The re-oxidized carrier may be subsequently transported to fuel reactor 101 for use as the metal ferrite oxygen carrier in a cyclic operation.

It is understood that FIG. 1 provides an exemplary application illustrating gasification with a solid carbonaceous fuel such as coal, coke, coal and biomass char, and the like, however the specifics of the process illustrated are not intended to be limiting. Within this disclosure, it is only necessary that a metal ferrite oxygen carrier be delivered to a fuel reactor, where the metal ferrite oxygen carrier comprises $MFe_xO_y$ where $1.5 \leq x \leq 2.5$ and $3.5 \leq y \leq 4.5$, and where M is one of Ca, Ba, Mg, Sr and combinations thereof, and that the metal ferrite oxygen carrier contact a solid carbonaceous fuel at a reducing temperature sufficient to reduce some portion of the metal ferrite oxygen carrier and oxidize some portion of the solid carbonaceous fuel to generate a product stream comprising at least 50 vol. %, 70 vol. %, 80 vol. %, or 90 vol. % CO and $H_2$. In an embodiment, M is Ca, Ba, or combinations thereof, and in a further embodiment, $MFe_xO_y$ is one of $CaFe_2O_4$, $BaFe_2O_4$, and combinations thereof. The inert support when present does not participate in the oxidation and reduction reactions of the $MFe_xO_y$. In an embodiment, the inert support is alumina ($Al_2O_3$).

Description of Embodiments $BaFe_2O_4$ and $CaFe_2O_4$ have very high reactivity with coal and carbon. See e.g., Fan et al., "Novel New Oxygen Carriers for Chemical Looping Combustion of Solid Fuels," *Energy Fuels* 28 (2014); see also Siriwardane et al., "Evaluation of reaction mechanism of coal-metal-oxide interactions in chemical looping combustion," *Combustion and Flame* 157 (2010). Thermodynamic analysis (FactSage) was conducted to evaluate the reaction of these materials with carbon and synthesis gas. The data indicated that carbon monoxide (CO) was the main product and ferrite can be fully reduced to $Fe^0$ at temperatures above ~700° C., where the change in Gibbs Free Energy is negative. Thermodynamic analysis data for the reaction of $CaFe_2O_4$ with CO and $H_2$ indicated that the reactions with both $H_2$ and CO are not thermodynamically favorable. The change in Gibbs Free Energy is positive for temperature below 1000 C for the hydrogen reaction, and likewise positive for the whole temperature range for CO. This is very encouraging because $CaFe_2O_4$ can react with coal to produce synthesis gas but does not react with synthesis gas to produce deep oxidation products.

The performance of metal ferrite oxygen carriers comprising $CaFe_2O_4$ and $BaFe_2O_4$ is illustrated at FIGS. 2-8. $BaFe_2O_4$ and $CaFe_2O_4$ were prepared by mixing metal nitrate precursors with citric acid to enhance bonding. The mixture was heated in an oven to 1000° C. at a ramp rate of 3° C./min in air and kept at 1000° C. for 6 h. Coal was mixed physically with the oxygen carrier with a mass ratio (oxygen carrier mass/coal mass) corresponding to the stoichiometric oxygen supply to produce CO.

Bench-scale fixed-bed flow reactor (inner diameter 13 mm) tests were conducted with a 1.5 g sample containing oxygen carrier and coal. The outlet gas compositions ($CO_2$, $H_2$, $CH_4$, and CO) from the reactor were measured using a MS (Pfeiffer Omnistar). Because the mass spectral peaks for $N_2$ overlap with those of CO, He was used as the flow gas; the sample was heated in He at a flow rate of 100 cm$^3$/min from ambient to 800° C. (ramp rate of 4° C./min) and kept isothermal at 800° C. for 60 min. After the gasification step, the sample was exposed to air for 60 min at 800° C. In order to understand the effect of steam, some experiments were performed with 15% steam/He as the flow gas during heating.

X-ray diffraction (XRD) analyses were carried out using a Panalytical PW 3040 X-Pert Pro XRD system equipped with a 60 kV PW 3373/00 Cu LFF high-power ceramic tube with a Cu anode and a PW 3011/20 detector. The X-ray wavelength used was Cu KR-1 at 1.540 56 Å. The maximum goniometer resolution was 0.003° (2θ). System calibration was carried out using a polysilicon-pressed disk with the Si<111> referenced to 28.443° (2θ). Sample data were acquired at 40 kV and 45 mA in a line-focus mode using a standard PW3071/60 powder diffraction stage.

TGA was conducted in a thermogravimetric analyzer (TA Model 2050) coupled with a Pfeiffer Thermostar D-35614 mass spectrometer (MS) for analyzing the composition of the outlet gas stream from TGA. The samples (coal-oxygen carrier mixtures) were placed in a 5-mm deep and 10-mm diameter crucible. Approximately 60 mg of the solid fuel-metal oxide mixture was heated in a quartz bowl from ambient temperature to 800-950° C. at a heating rate of 200° C./min in argon (Ar) at a flow rate of 100 sccm. The sample temperature was then maintained isothermally for 30 min. Then air was introduced for oxidation at a flow rate of 100 sccm. Compositions from the TGA outlet gas stream were measured using a MS (Pfeiffer Omnistar).

Figure 2:
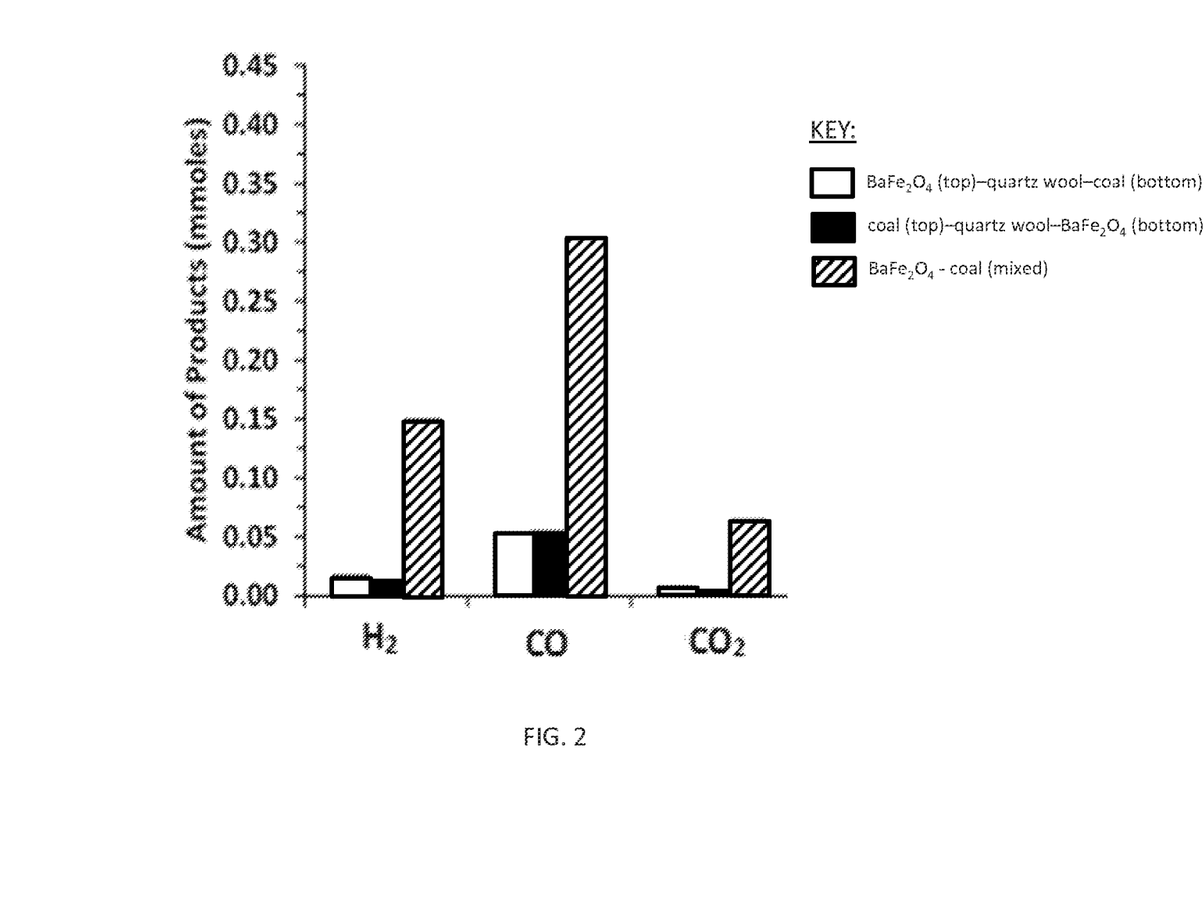
FIG. 2 illustrates CO, $H_2$, and $CO_2$ generation for a $BaFe_2O_4$ carrier with coal in contacting and non-contacting arrangements.

The gasification reaction appears to strongly depend on solid-solid interactions. To understand the importance of solid-solid interaction of coal and $BaFe_2O_4$, TGA experiments were conducted separating coal and $BaFe_2O_4$ with quartz wool and in two vertical configurations: coal (top)-quartz wool-$BaFe_2O_4$ (bottom) and coal (bottom)-quartz wool-$BaFe_2O_4$ (top). In these two configurations, when coal was not mixed with $BaFe_2O_4$, the initial TGA weight loss corresponded to the coal de-volatilization and no subsequent weight loss occurred due to gasification. When air was introduced there was additional weight due to combustion of residual coal. Only very small quantities of CO and $H_2$ were present in the outlet gas stream when the oxygen carrier was not mixed with coal indicating minimal gasification of coal. Comparative data plots of the amounts of CO, $H_2$, and $CO_2$ produced when coal was mixed with $BaFe_2O_4$ and for the two configurations of coal separated from $BaFe_2O_4$ are shown in FIG. 2. Clearly the gasification products, CO and $H_2$, were significantly higher when coal and $BaFe_2O_4$ ($BaFe_2O_4$-coal (mixed)) were mixed, which confirmed that the solid-solid reaction is necessary for gasification of coal with $BaFe_2O_4$.

Figure 3:
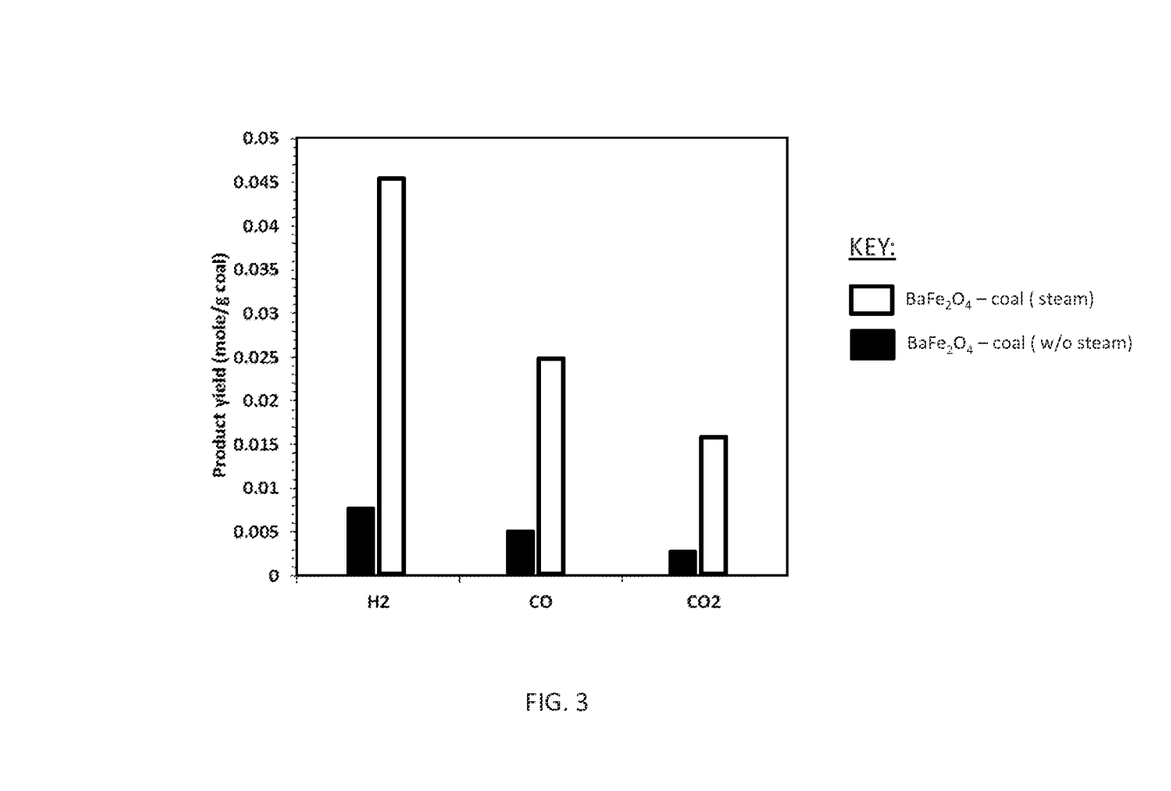
FIG. 3 illustrates CO, $H_2$, and $CO_2$ generation for a $BaFe_2O_4$ carrier with and without steam.

The coal/$BaFe_2O_4$ mixture was heated in a fixed-bed flow reactor with and without 15% steam to study the effect of steam on gasification. Comparative plots of the product gas yields normalized to the initial mass of coal during the temperature ramps of coal-$BaFe_2O_4$-steam and coal-$BaFe_2O_4$ without steam are shown in FIG. 3. For Wyodak coal, synthesis gas was highest for coal-$BaFe_2O_4$-steam, indicating that the production of $H_2$ and CO was more favorable when both steam and $BaFe_2O_4$ were present. It is interesting to note that the $CO_2$ level during the coal gasification step with $BaFe_2O_4$ did not increase significantly when steam was added. This is due to the low reactivity of $BaFe_2O_4$ with CO and $H_2$ in synthesis gas, which is very advantageous for maximizing synthesis gas production during chemical looping gasification.

Figure 4:
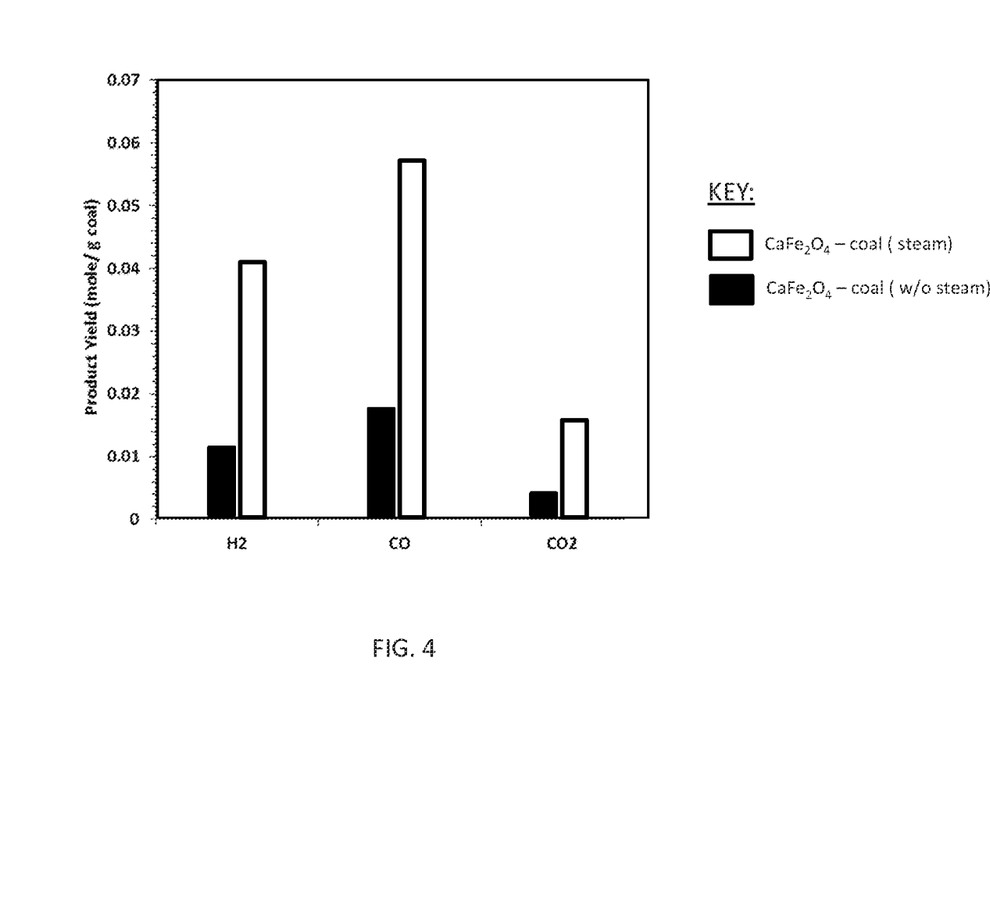
FIG. 4 illustrates CO, $H_2$, and $CO_2$ generation for a $CaFe_2O_4$ carrier with and without steam.

Comparative plots of product gas yields normalized to mass of coal during the temperature ramp with coal-$CaFe_2O_4$-steam and coal-$CaFe_2O_4$ are shown in FIG. 4. For Wyodak coal, CO was significantly higher for coal- CaFe$_2$O$_4$-steam, indicating that the formation of CO from coal was more favorable when both steam and CaFe$_2$O$_4$ were present. It is also interesting to note that CO$_2$ remained low while CO increased significantly with coal-CaFe$_2$O$_4$-steam, indicating that additional CO formed did not further react with CaFe$_2$O$_4$ to produce CO$_2$. Thus, the coal-CaFe$_2$O$_4$-steam system is highly suitable for gasification of coal.

Figure 5:
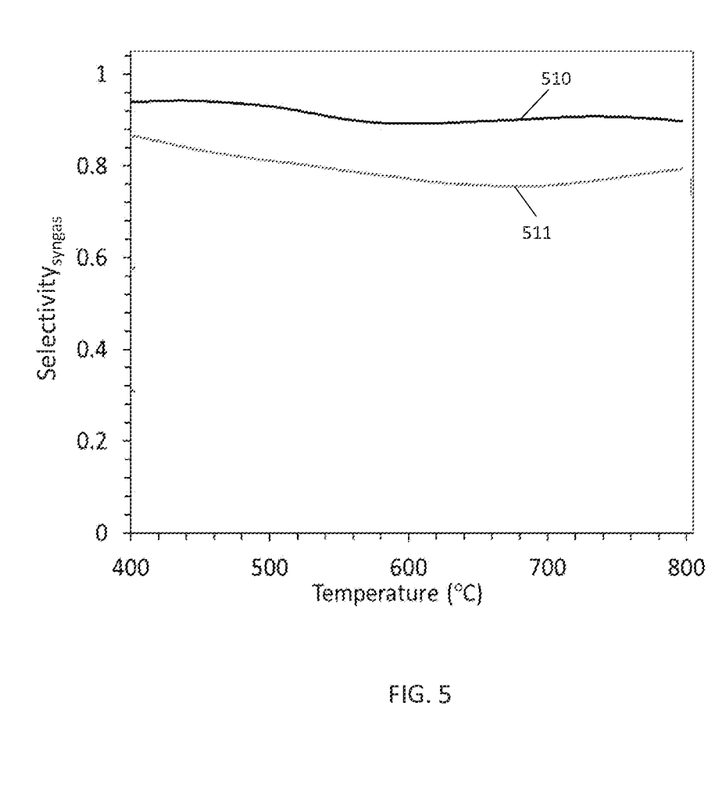
FIG. 5 illustrates (CO+H2) selectivity versus temperature for carriers of $BaFe_2O_4$ and $CaFe_2O_4$.

Selectivity values for the synthesis gas production as a function of temperature are shown at FIG. 5, where 510 illustrates selectivity of CaFe$_2$O$_4$-coal-steam and 511 illustrates selectivity of BaFe$_2$O$_4$-coal-steam, and where Selectivity=(Moles of CO+H$_2$)/(Moles of CO$_2$+CH$_4$+CO+H$_2$). As shown in FIG. 5, synthesis gas selectivity remained constant with increasing temperature during the temperature ramp from 400 to 800° C. when the oxygen carriers, CaFe$_2$O$_4$ or BaFe$_2$O$_4$, were present. It should be also noted that synthesis gas selectivity was close to 0.9 for CaF$_2$O$_4$ and was close to 0.8 with BaFe$_2$O$_4$, which indicated that the major portion of the product gas contains synthesis gas when these oxygen carriers are present. Thus, high quality synthesis gas that is even suitable for various chemical synthesis processes may be obtained when these oxygen carriers are present during steam gasification.

Figure 6:
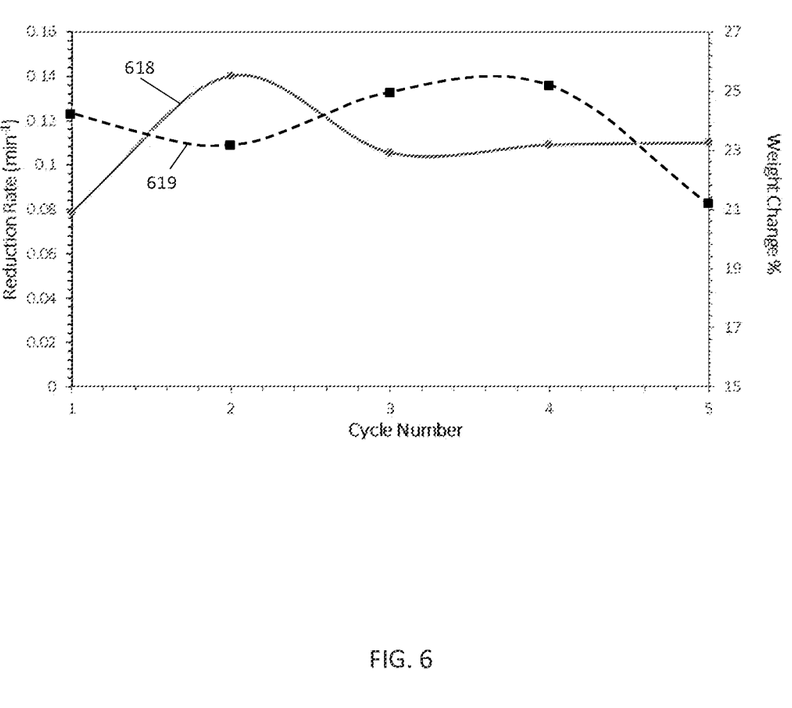
FIG. 6 illustrates weight change and reaction rate over a cyclic test.

A 5-cycle TGA test was conducted with lampblack carbon and BaFe$_2$O$_4$. A mixture containing 72 mg of BaFe$_2$O$_4$ and 11 mg of carbon was heated in Ar from ambient to 900° C. at a ramp rate of 200° C./min. After 30 min at 900° C., air was introduced at 900° C. for 30 mins. After the gasification/oxidation cycle, the sample was cooled to ambient temperature and then transferred to a vessel where it was thoroughly mixed with a new sample of carbon. The reacted oxygen carrier/new carbon mixture was transferred to the TGA sample holder for the next cycle of gasification/oxidation. A small amount of sample loss was observed during the sample transfer. The percentage weight changes and maximum reduction rates as a function of cycle number are shown in FIG. 6, where 618 represents reduction rate and 619 represents % weight change. Fairly stable weight changes and reduction rates were observed during the cyclic test despite some sample loss during sample transfer indicating that no deactivation of the oxygen carrier occurred during cyclic tests.

Figure 7:
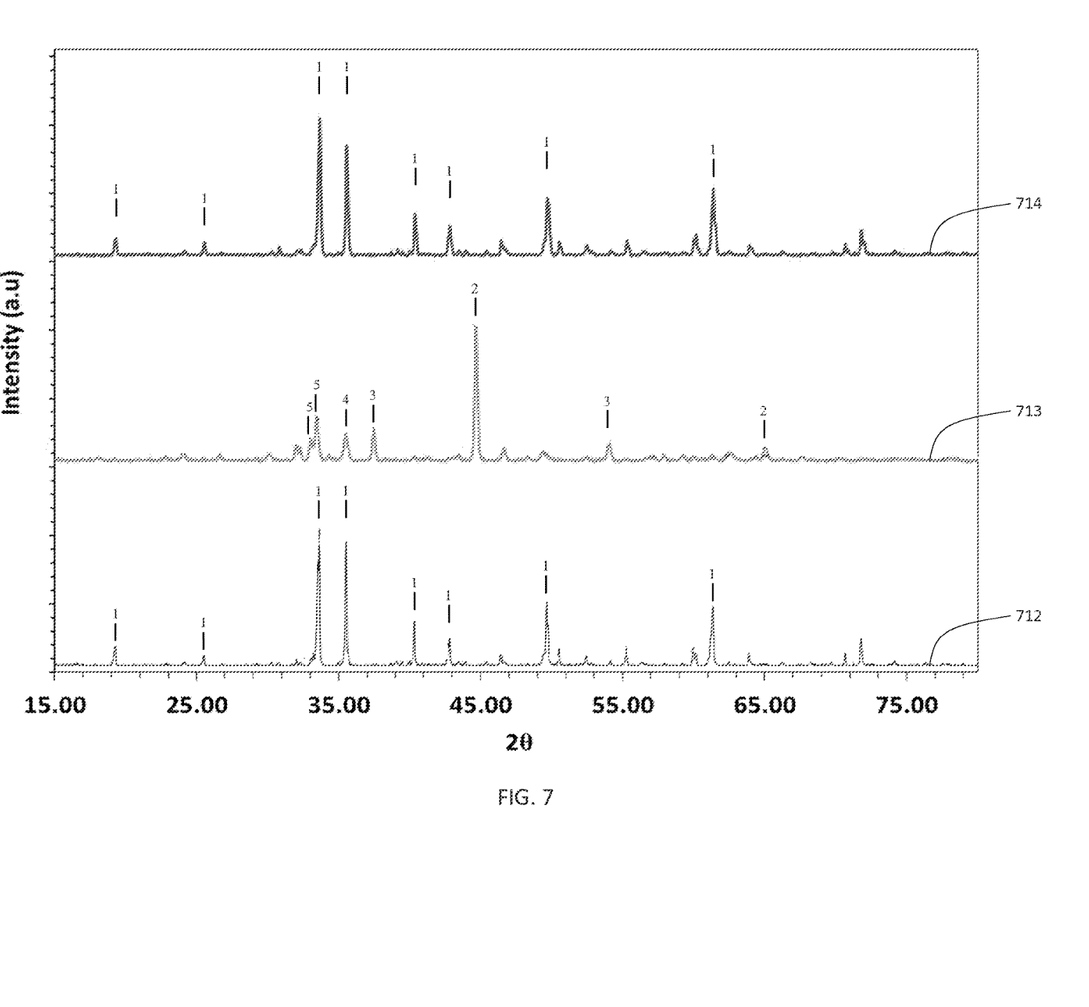
FIG. 7 illustrates XRD results for a metal ferrite oxygen carrier comprising $CaFe_2O_4$.
Figure 8:
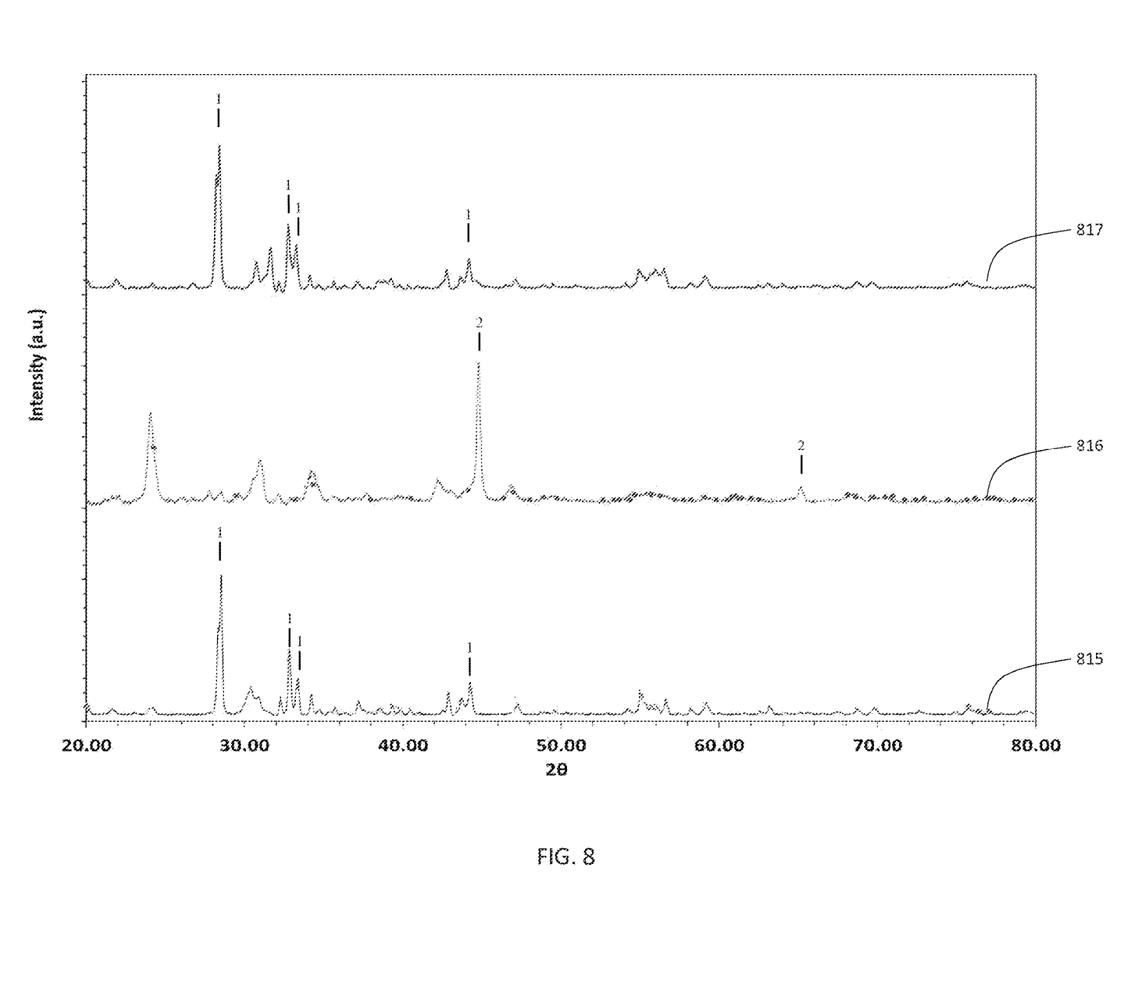
FIG. 8 illustrates XRD results for a metal ferrite oxygen carrier comprising $BaFe_2O_4$.

XRD data of fresh oxygen carriers, after temperature programmed reaction with Wyodak coal, and after oxidation with air are shown in FIGS. 7 and 8. XRD data of a fresh CaFe$_2$O$_4$ sample indicated the presence of CaFe$_2$O$_4$ phase as shown in FIG. 7, indicated by trace 712 at 2θ values indicated at 1. After reaction with coal, phases corresponding to Fe$^3$, CaO, Fe$_2$O$_3$ and Ca$_2$Fe$_2$O$_5$ were observed as indicated by trace 713 at 2θ values indicated at 2, 3, 4, and 5 respectively, clearly indicating a reduction of CaFe$_2$O$_4$ by coal. When the sample was oxidized after the reaction with coal, the XRD pattern was very similar to the fresh sample, as indicated by trace 714. The data indicated that the original CaFe$_2$O$_4$ phase was formed after a full cycle of reduction and oxidation and the material is suitable for the cyclic tests. Similarly, XRD data of fresh BaFe$_2$O$_4$ indicated the presence of BaFe$_2$O$_4$ phase as shown in FIG. 8, indicated by trace 815 at 2θ values indicated at 1. After reacting with coal, new phases BaCO$_3$ and Fe$^0$ were observed, indicating reduction of the oxygen carrier by coal. This is illustrated by trace 816 where Fe$^0$ is indicated at 2θ values designated 2. It appears that reduced forms of Ba reacted with CO$_2$ to form BaCO$_3$, which is different from that was observed with CaFe$_2$O$_4$. Thermal stability of BaCO$_3$ is better than with CaCO$_3$ and that may be the reason why CaCO$_3$ was not observed in the reduced CaFe$_2$O$_4$. The original BaFe$_2$O$_4$ was re-formed after the oxidation following the reaction with coal, as indicated by trace 816. If the reaction is performed isothermally at a higher temperature it may be possible to avoid BaCO$_3$ formation.

Unlike other transition metal ferrites the two alkaline earth ferrites were more reactive with carbon via solid-solid reactions but less reactive with synthesis gas. BaFe$_2$O$_4$ does not crystallize in a spinel structure like other transition metal ferrites but it crystallizes in a complicated orthorhombic structure (38) because the size of Ba$^{2+}$ is too large to be accommodated in the octahedral sites. From the XRD data in our present work, BaFe$_2$O$_4$ was also identified to be in the orthorhombic structure. Similar stuffed-framework structures are reported with Ca ferrites (39) but CaFe$_2$O$_4$ has shown a completely different atomic arrangement from Ba ferrites. Better reactivity of alkaline earth ferrites with coal or carbon and low reactivity with synthesis gas, as compared to that of transition-metal ferrites, could be due to these structural differences.

The disclosure thereby provides a metal ferrite oxygen carrier having improved syngas production over metal oxides currently used in the chemical looping gasification of solid carbonaceous fuels, such as coal, coke, coal and biomass char, and the like. The metal ferrite oxygen carrier comprises MFe$_x$O$_y$, where MFe$_x$O$_y$ is a chemical composition and M is one of Ca, Ba, Mg, Sr and combinations thereof.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of gasifying a solid carbonaceous fuel comprising:
    delivering a metal ferrite oxygen carrier to a fuel reactor, where the metal ferrite oxygen carrier comprises MFe$_x$O$_y$, where $1.5 \leq x \leq 2.5$ and $3.5 \leq y \leq 4.5$, and where M is one of Mg, Ca, Ba, Sr and combinations thereof;
    mixing the solid carbonaceous fuel and the metal ferrite oxygen carrier in the fuel reactor and maintaining the fuel reactor at a reducing temperature, where the reducing temperature is sufficient to reduce some portion of the metal ferrite oxygen carrier and oxidize some portion of the solid carbonaceous fuel, and generating gaseous products in the fuel reactor; and
    withdrawing a product stream from the fuel reactor, where the gaseous products comprise the product stream, and where at least 50 vol. % of the product stream consists of CO and H$_2$.

2. The method of claim 1 where the reducing temperature is from about 700° C. to about 1100° C.

3. The method of claim 2 where 1.8≤x≤2.2 and 3.8≤y≤4.2.

4. The method of claim 3 where M is Ca, Ba, and combinations thereof.

5. The method of claim 4 where at least 70 vol. % of the product stream consists of CO and $H_2$.

6. The method of claim 2 where the $MFe_xO_y$ comprises at least 30 wt. % of the metal ferrite oxygen carrier.

7. The method of claim 6 where the metal ferrite oxygen carrier further comprises an inert support, where the inert support comprises from about 5 wt. % to about 60 wt. % of the metal ferrite oxygen carrier.

8. The method of claim 1 further comprising injecting a gasification agent into the fuel reactor.

9. The method of claim 8 where the gasification agent comprises steam.

10. The method of claim 1 where the mixing the solid carbonaceous fuel and the metal ferrite oxygen carrier in the fuel reactor step generates a reduced carrier, where the reduced carrier comprises an M component and an $Fe_cO_d$ component, where the M component comprises some portion of the M comprising the $MFe_xO_y$, and where the $Fe_cO_d$ component comprises some portion of the Fe comprising the $MFe_xO_y$, where c>0 and d≥0.

11. The method of claim 10 where the $Fe_cO_d$ component comprises $Fe^0$.

12. The method of claim 11 where the M is Ba and where the M component comprises $BaCO_3$.

13. The method of claim 11 where the M is Ca and where the M component comprises CaO.

14. The method of claim 10 further comprising oxidizing the reduced carrier by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the M component, and some portion of the $Fe_cO_d$ component, and where the product of the oxidizing reaction is a re-oxidized carrier, where the re-oxidized carrier comprises the $MFe_xO_y$ on an inert support.

15. The method of claim 14 where the oxidizing temperature is from about 700° C. to about 1100° C.

16. The method of claim 15 where oxidizing the reduced carrier occurs in an oxidizing reactor, and further comprising:
transferring the reduced carrier from the fuel reactor to the oxidizing reactor;
supplying the oxidizing gas to the oxidizing reactor, thereby generating the re-oxidized carrier;
transferring the re-oxidized carrier from the oxidizing reactor to the fuel reactor; and
repeating the delivering the metal ferrite oxygen carrier to the fuel reactor, the mixing the solid carbonaceous fuel and the metal ferrite oxygen carrier in the fuel reactor, and the withdrawing the product stream from the fuel reactor utilizing an additional quantity of the solid carbonaceous fuel as the solid carbonaceous fuel and the re-oxidized carrier as the metal ferrite oxygen carrier.

17. A method of gasifying a solid carbonaceous fuel comprising:
delivering a metal ferrite oxygen carrier to a fuel reactor, where the metal ferrite oxygen carrier comprises $MFe_xO_y$, where 1.8≤x≤2.2 and 3.8≤y≤4.2, and where M is one of Mg, Ca, Ba, Sr, and combinations thereof, and where the $MFe_xO_y$ comprises at least 30 wt. % of the metal ferrite oxygen carrier;
mixing the solid carbonaceous fuel and the metal ferrite oxygen carrier in the fuel reactor and maintaining the fuel reactor at a reducing temperature of from about 700° C. to about 1100° C. and reducing some portion of the $MFe_xO_y$ and oxidizing some portion of the solid carbonaceous fuel, and generating gaseous products in the fuel reactor and generating a reduced carrier, where the reduced carrier comprises an M component and an $Fe_cO_d$ component, where the M component comprises some portion of the M comprising the $MFe_xO_y$, and where the $Fe_cO_d$ component comprises some portion of the Fe comprising the $MFe_xO_y$, where c>0 and d≥0;
withdrawing a product stream from the fuel reactor, where the gaseous products comprise the product stream, and where at least 50% vol. % of the product stream consists of CO and $H_2$;
oxidizing the reduced carrier by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the M component, and some portion of the $Fe_cO_d$ component, and where the product of the oxidizing reaction is a re-oxidized carrier, where the re-oxidized carrier comprises the $MFe_xO_y$ on an inert support; and
repeating the delivering the metal ferrite oxygen carrier to the fuel reactor, the mixing the solid carbonaceous fuel and the metal ferrite oxygen carrier in the fuel reactor, the withdrawing the product stream from the fuel reactor, and the oxidizing the reduced carrier by contacting the reduced carrier and the oxidizing gas at an oxidizing temperature by utilizing an additional quantity of the solid carbonaceous fuel as the solid carbonaceous fuel and the re-oxidized carrier as the metal ferrite oxygen carrier.

18. The method of claim 17 where M is Ca, Ba, and combinations thereof.

19. The method of claim 4 where at least 70 vol. % of the product stream consists of CO and $H_2$.

20. The method of claim 15 further comprising injecting a gasification agent into the fuel reactor, where the gasification agent comprises steam.

* * * * *